(12) United States Patent
Kalkanoglu et al.

(10) Patent No.: US 8,240,100 B2
(45) Date of Patent: *Aug. 14, 2012

(54) LAMINATED SHINGLE WITH WIDER NAILING ZONE

(75) Inventors: Husnu M. Kalkanoglu, Swarthmore, PA (US); Kermit E. Stahl, North Wales, PA (US); John K. Donaldson, Newtown Sq, PA (US)

(73) Assignee: CertainTeed Corporation, Valley Forge, PA (US)

( * ) Notice: Subject to any disclaimer, the term of this patent is extended or adjusted under 35 U.S.C. 154(b) by 1206 days.

This patent is subject to a terminal disclaimer.

(21) Appl. No.: 11/426,056

(22) Filed: Jun. 23, 2006

(65) Prior Publication Data

US 2006/0265990 A1  Nov. 30, 2006

Related U.S. Application Data

(62) Division of application No. 10/289,441, filed on Nov. 6, 2002, now abandoned.

(51) Int. Cl.
  *E04D 1/00* (2006.01)
(52) U.S. Cl. .......................................................... 52/518
(58) Field of Classification Search ................... 52/105, 52/557, 559
  See application file for complete search history.

(56) References Cited

U.S. PATENT DOCUMENTS

| 3,138,897 | A | 6/1964 | McCorkle |
| 3,252,257 | A | 5/1966 | Price |
| 3,377,762 | A | 4/1968 | Chalmers et al. |
| 3,434,259 | A | 3/1969 | Le Rae Corbin |
| 3,541,745 | A * | 11/1970 | Probst .............................. 52/105 |
| 3,624,975 | A | 12/1971 | Morgan et al. |
| 3,921,358 | A | 11/1975 | Bettoli |
| 4,274,243 | A | 6/1981 | Corbin et al. |
| 4,559,267 | A | 12/1985 | Freshwater et al. |
| 4,636,425 | A | 1/1987 | Johnson et al. |
| 4,717,614 | A | 1/1988 | Bondoc et al. |
| 4,824,880 | A | 4/1989 | Algrim et al. |
| 4,869,942 | A * | 9/1989 | Jennus et al. .................... 428/77 |
| 5,011,726 | A | 4/1991 | Chich et al. |
| 5,209,802 | A | 5/1993 | Hannah et al. |
| 5,239,802 | A | 8/1993 | Robinson |
| 5,287,669 | A * | 2/1994 | Hannah et al. ................... 52/518 |
| 5,305,569 | A * | 4/1994 | Malmquist et al. .......... 52/309.8 |
| 5,822,943 | A | 10/1998 | Frankoski et al. |
| 5,916,103 | A * | 6/1999 | Roberts ........................... 52/552 |
| 5,950,387 | A | 9/1999 | Stahl et al. |
| 6,010,589 | A | 1/2000 | Stahl et al. |
| 6,014,847 | A | 1/2000 | Phillips |

(Continued)

FOREIGN PATENT DOCUMENTS

CA  2 238 455  11/1999

(Continued)

*Primary Examiner* — Jerry Redman
(74) *Attorney, Agent, or Firm* — Paul & Paul

(57) ABSTRACT

A multiple-layer laminated shingle and a method of making the shingle are provided, in which at least one adhesive of high temperature resistance is applied for securing the shingle layers together, to reduce reliance on a roofer having to fasten (via nails, staples or other fasteners) through a narrow headlap zone of a posterior shingle layer in order to secure the posterior shingle layer to a roof; such that a vertically wide portion of the headlap area of the anterior shingle layer is presented to the roofer as a nailing zone.

12 Claims, 7 Drawing Sheets

U.S. PATENT DOCUMENTS

| | | |
|---|---|---|
| 6,083,592 A | 7/2000 | Chich |
| 6,092,345 A | 7/2000 | Kalkanoglu et al. |
| 6,145,265 A | 11/2000 | Malarkey et al. |
| 6,190,754 B1 | 2/2001 | Bondoc et al. |
| 6,220,329 B1 | 4/2001 | King et al. |
| 6,289,648 B1 | 9/2001 | Freshwater et al. |
| 6,457,290 B1 | 10/2002 | Elliott |
| 6,471,812 B1 | 10/2002 | Thompson et al. |
| 6,523,316 B2 | 2/2003 | Stahl et al. |
| 6,708,456 B2 | 3/2004 | Kiik et al. |
| 6,709,760 B2 | 3/2004 | Trumbore et al. |
| 6,933,037 B2 * | 8/2005 | McCumber et al. .......... 428/143 |
| 7,188,794 B2 * | 3/2007 | Ban et al. ....................... 242/242 |
| 2002/0142180 A1 | 10/2002 | Trumbore et al. |
| 2004/0055240 A1 | 3/2004 | Kiik et al. |
| 2004/0107664 A1 | 6/2004 | Rodrigues |
| 2004/0258883 A1 * | 12/2004 | Weaver .......................... 428/143 |
| 2005/0284070 A1 * | 12/2005 | Binkley et al. .................. 52/543 |
| 2007/0042158 A1 * | 2/2007 | Belt et al. ....................... 428/143 |

FOREIGN PATENT DOCUMENTS

| | | |
|---|---|---|
| GB | 2 094 370 | 9/1982 |
| GB | 2 189 791 A | 11/1987 |

* cited by examiner

LAMINATED SHINGLE WITH WIDER NAILING ZONE

CROSS-REFERENCE TO RELATED APPLICATION

This application is a divisional of U.S. Ser. No. 10/289,441 filed Nov. 6, 2002 now abandoned.

BACKGROUND OF THE INVENTION

Laminated shingles are known in the art to be made from asphaltic roofing material overlaid upon one another, and secured together by means of an adhesive to provide a shingle having a thicker section. The anterior layer of the shingle has alternating tabs and cut out portions in the form of slots of various dimension in the lower end of the shingle, and an upper end of the shingle that is not divided into tabs. The posterior shingle layer, often called a backing sheet is applied, generally to the rear surface of the lower end of the anterior shingle layer, covering the rear surfaces of the tabs, such that the two shingle layers are not coextensive in area.

In applying the shingles to a roof, by means of fasteners such as nails, staples or the like in accordance with the teachings of the prior art, there is a longitudinal strip of double thickness through which the nails, staples or the like fasteners must be applied, in which they will pass through both shingle layers, such strip being above the area of the slots, but below the upper edge of the posterior shingle layer.

In order to most efficiently package a plurality of shingles in a given bundle, the posterior shingle layer is generally less than one half the width of the shingle, such that the shingles may be alternated in packaging without a stack of packaged shingles forming a "hump". Typically, a backer strip or posterior shingle layer for a shingle of 12 inches in width, is usually 5⅞ to 5¹⁵⁄₁₆ inches wide in order to avoid the creation of an unduly high zone or "hump" in the middle of the shingle bundle, which is not desirable. Such 12 inch wide shingles then typically have an exposure width of 5 inches, leaving the common bond area between the laminated shingle layers to be a longitudinal strip of less than 1 inch in width.

Professional roofers find this width too narrow, as it interferes with efficient fastening of shingles to a roof, slowing down the speed of shingle application.

One approach to the problem is set forth in U.S. Pat. No. 6,145,265, granted Nov. 14$^{th}$, 2000, the complete disclosure of which is herein incorporated by reference. That approach has been to enlarge the width of the posterior shingle layer, to provide a larger (higher) common bond strip, of greater width than 1 inch, so that the nails, staples or like fasteners have a wider strip for passing through two layers.

Where laminated shingles have a common bond area that is too narrow, such as 1 inch or less, there can be a tendency for roofers to fail to apply the nail or staple fasteners into the common bond area, but to apply their fasteners above the common bond area, such that the fasteners pass through only the anterior shingle layer, and do not intercept the upper portion of the posterior shingle layer.

On roofs having a gentle slope or pitch, such misapplication of shingle fasteners may not be so susceptible to later problems. However, in roofs of steep pitch or slope, especially in warmer weather, such as summer weather, and in more southerly locations where roofs are subjected to more sun and greater heat in the summer, the temperature of a roof, particularly a dark roof, can reach 170° F. In more northerly locations in the summer, the temperature of a lighter colored roof, such as a white or light gray roof, in summer conditions may not reach a temperature higher than 140° F.

Most particularly, in more southern geographic areas, during the summer, and wherein roofs are of darker color, the temperature of the roof may approach the softening temperature of the normally bitumen-based adhesive, such as asphalt, which adheres two laminated layers of the laminated shingle together. With such softening of the bitumen-based adhesive, there leaves the possibility, especially for roofs of steeper pitch or slope, that the posterior shingle layer of any given shingle, if the fasteners have not penetrated such posterior layer when the shingle was applied to the roof, the posterior shingle layer, under its own weight, may overcome the adhesive quality and deformation resistance of the softening bitumen, and slide out beneath the anterior shingle layer, at least compromising the quality of the roof.

SUMMARY OF INVENTION

The present invention is directed toward solving the above problems by providing a laminated shingle in which a stronger adhesive is applied, having a higher heat resistant temperature than the adhesive that normally fastens the shingle layers together, such that under hot conditions and on steep roofs, the stronger adhesive will be sufficient to keep the two shingle layers adhered together even if the heat resistant temperature, or softening point temperature of a prior art shingle laminating adhesive is reached, such that if fasteners that are used to fasten the shingle to a roof are applied through the anterior shingle layer only and not the posterior shingle layer, the posterior shingle layer will nevertheless remain in place, adhered behind the anterior shingle layer.

A wide fastening zone is provided on the shingle, not limited to inserting fasteners through the double layers of shingle, but wherein the fastening zone is sufficiently wide to embrace at least a portion of the anterior shingle layer only, having no posterior shingle layer therebehind. In another facet of the invention, optional single shingle layer and double shingle layer areas are presented corresponding to wider and narrower fastening zones, respectively, leaving the installer the option of nailing through two layers of shingle, or only a single layer of shingle, when nailing or otherwise fastening a shingle to a roof. The fastening zones may be defined by demarcation limits, such as marked lines, lines of adhesive, or combinations of both.

Accordingly, it is a primary object of this invention to provide a novel multi-layer laminated shingle, in which at least one high softening point adhesive is used to secure the shingle layers together.

It is another object of this invention to accomplish the above object, in which if more than one adhesive is used, one of the adhesives has a heat resistance to a temperature level that is higher than that of the other adhesive.

It is a further object of this invention to accomplish the above objects, wherein temperature levels normally reached during various seasonal parts of the year, and even for darker shingles, are not sufficiently high to soften an adhesive that is used to adhere the shingle layers together.

It is yet another object of this invention to provide a laminated shingle having a wide nailing zone, without having a wide double-layer nailing zone, by using a high temperature softening point adhesive or an adhesive that does not soften at high temperatures or an adhesive having a high shear modulus, to secure the layers of the laminated shingle together, such that it is no longer necessary to nail the shingle through both layers of the laminate in order to retain the posterior layer on a roof.

Other objects of the invention comprise providing optional fastening zones for fastening a shingle to a roof through either one two-layer fastening zone, or through a single-layer fastening zone, or combinations of both.

Other objects and advantages of the present invention will be readily apparent upon a reading of the following brief descriptions of the drawing figures, the detailed descriptions of the preferred embodiments, and the appended claims.

BRIEF DESCRIPTIONS OF THE DRAWING FIGURES

DETAILED DESCRIPTIONS OF THE PREFERRED EMBODIMENTS

Figure 1:
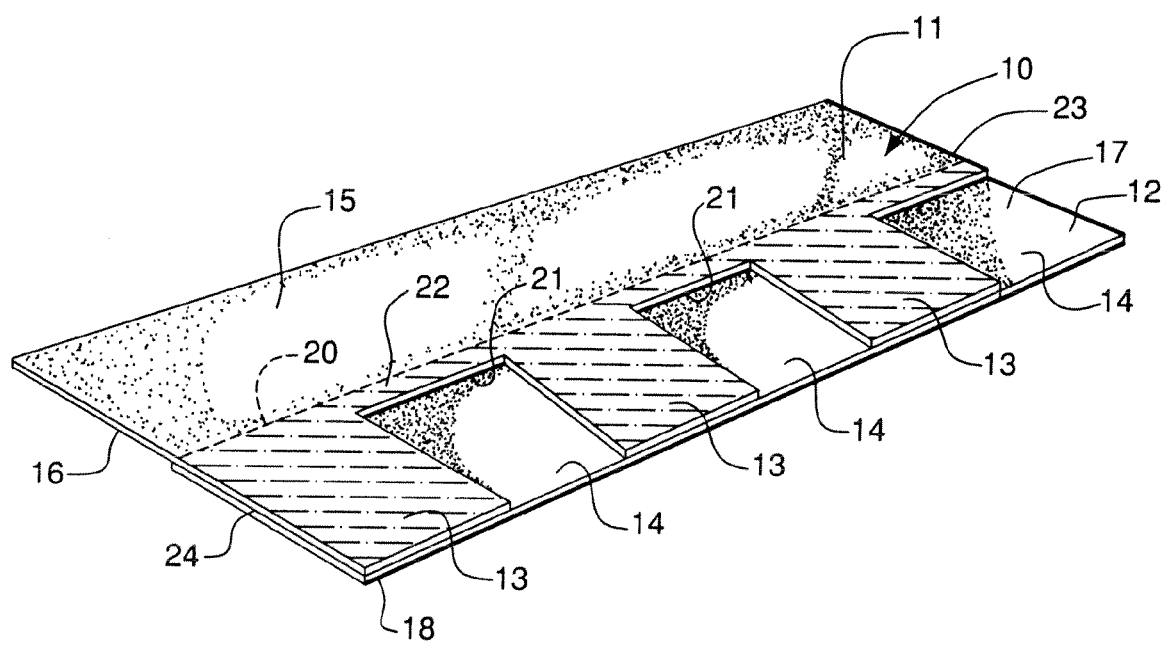
FIG. 1 is a top perspective view of a prior art shingle of the type discussed herein.

Referring now to the drawings in detail, reference is first made to FIG. 1, wherein a prior art shingle is generally designated by the numeral 10, as having an anterior shingle layer 11 and a posterior shingle layer 12. The anterior shingle layer 11 has a plurality of tabs 13, separated by substantial cut-outs 14, spaced apart by the tabs 13, and formed as sizable slotted openings between the tabs 13. The shingle of FIG. 1 is often referred to as a multiple-ply dragon-tooth design.

The anterior shingle layer 11 has a front surface 15 and a rear surface 16. The posterior shingle layer 12 has a front surface 17 and a rear surface 18. The posterior shingle layer 12 has an upper edge 20. The cut-outs 14 in the anterior shingle layer 11 have an upper edge 21. Widthwise, the longitudinal area between the upper edge 21 of the cut-outs 14 and the upper edge 20 of the posterior shingle layer defines the common bond area 22, which runs from the right-most edge 23 of the shingle of FIG. 1, to the left-most edge 24. This common bond area, in which the two shingle layers 11 and 12 are co-extensive, defines the nailing or stapling zone that is desired by many installers for applying shingles to a roof.

Figure 2:
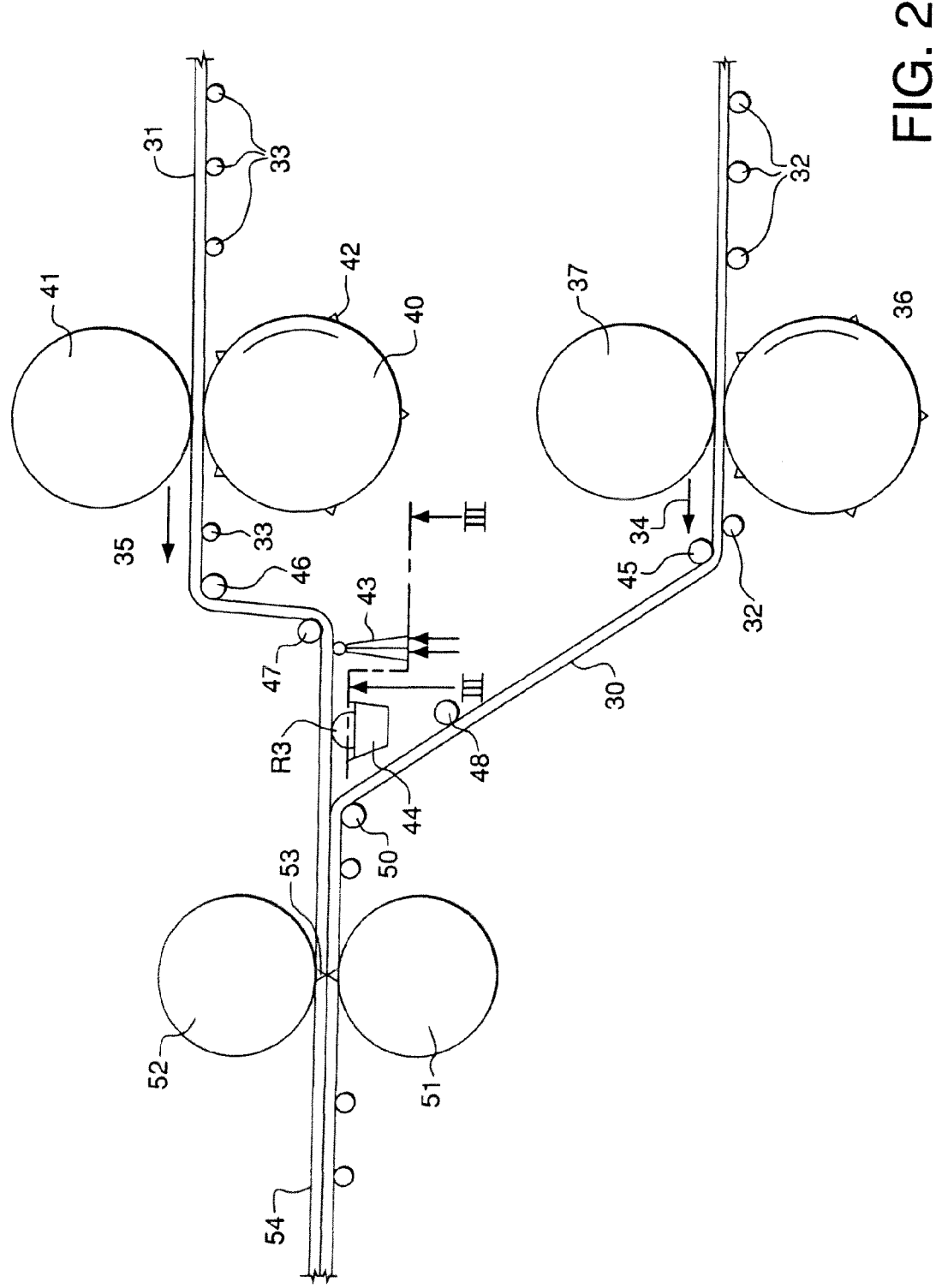
FIG. 2 is a side elevational view of a schematic of multi-layer shingle manufacture, looking in the transverse direction, wherein shingle material is conveyed left-to-right, in a longitudinal direction, and in which adhesive application between the shingle layers is illustrated.

Referring to FIG. 2, a description of the manufacture of shingles in accordance with this invention will be understood. In FIG. 2, continuous layers of shingle material for making the posterior shingle layers in accordance with this invention and the anterior shingle layers in accordance with this invention are shown at 30 and 31, respectively, being conveyed along rollers 32 and 33, respectively in their longitudinal paths of travel, as indicated by the arrows 34 and 35 respectively. For the layer of posterior shingle material 30, a cutting roller 36 and associated back-up roller 37 are shown, and for the anterior shingle layer 31, cutting and back-up rollers respectively numbered 40 and 41 are shown, with the roller 40 having a plurality of cutting blades 42, for cutting the cut-outs similar to those 14 shown in FIG. 1. The layer 31 of shingle material then passes over a pair of adhesive applicators 43 and 44, and the layers 30 and 31 of shingle material are brought together after passing around suitable turning rollers 45, 46, 47, 48 and 50, to be laminated together by adhesives delivered from the applicators 43 and 44, to then pass between cutting and back-up rollers 51, 52, whereby cutting type blade means 53 severs the laminated shingle material into discrete laminated shingles 54 at the left end of FIG. 2.

It will be understood that various techniques for making laminated shingles may be employed, such as those set forth in U.S. Pat. No. 6,092,345, issued Jul. 25, 2000.

Figure 3:
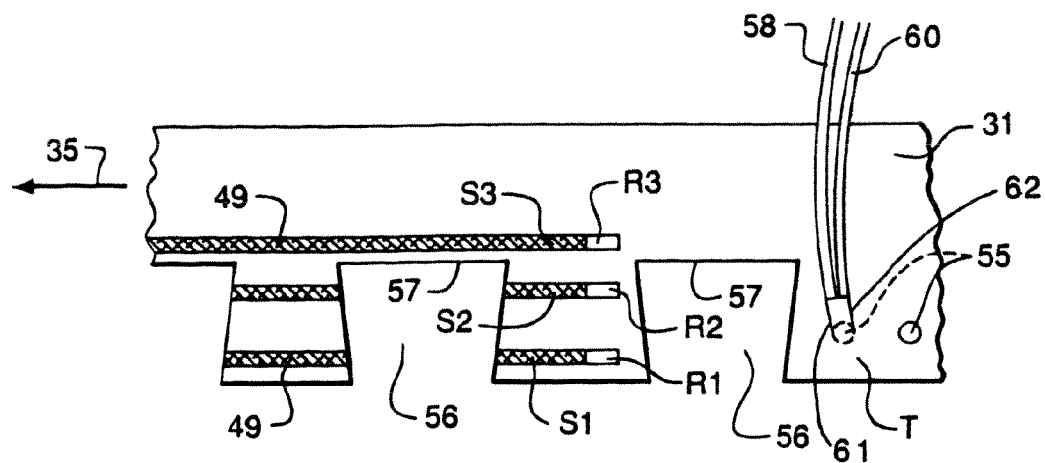
FIG. 3 is a top plan view of the rear surface of an anterior shingle layer, wherein two adhesive applications are shown being applied to the shingle layer.

Referring now to FIG. 3, it will be seen that, in one embodiment of the invention, horizontal adhesive strips S1, S2 and S3 of asphalt, bitumen or other adhesives are applied from rollers R1, R2, R3, respectively, of adhesive applicator 44, as the sheet of shingle material 31 moves leftward in the direction arrow 35 in FIGS. 2 and 3. It will also be seen that the adhesive applicator 43 is shown as applying a plurality of spots 55 of adhesive onto a rear surface of an anterior layer of the shingle material 31, in zones of tabs T between spaced-apart cut-outs 56, below the upper edge 57 of the cut-outs at a vertical location where strips of adhesive S1, S2, S3 are not applied. The adhesive applicator 43, like the applicator 44, may be of any type for applying an adhesive, from a single brush, roller, or the like, or may be of a type for applying adhesive from a two components adhesive application gun, as shown. In the applicator 43, two discrete adhesive applicator lines 58, 60 are shown, for delivering adhesive to two sides 61, 62 of an adhesive applicator gun, wherein the two component adhesive will undergo a chemical reaction when the two components which are normally separated combine within the gun, with the chemical reaction thereby occurring forming a chemical bond that secures the shingle layers 30, 31 together. Alternatively, one or both adhesive lines 58, 60 may deliver a conventional hot melt adhesive, such as ethylene vinyl acetate, a polyamide, a glue, or a bitumen-based adhesive, such as an asphalt, or the like. The adhesive applicator 44 will generally apply an adhesive of bitumen, asphalt or of any other type suitable to secure the two layers of shingle material 30, 31, together.

Figure 4:
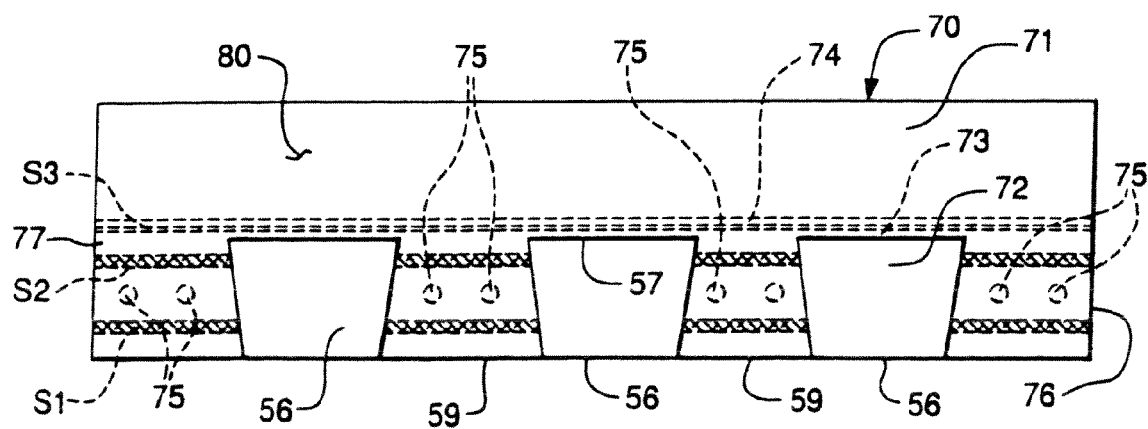
FIG. 4 is a top plan view of a shingle made in accordance with this invention, wherein the second adhesive is shown in a series of longitudinal dotted applications, with the common bond area between the two shingle layers being shown in dotted lines as well.

With reference to FIG. 4, it will be seen that a shingle 70 in accordance with this invention is shown as having anterior and posterior layers 71, 72, with a common bond or headlap area 73 shown therebetween, between the upper edge 74 of the posterior shingle layer 72 and the upper edge 57 of the cut-outs 56 in the anterior shingle layer 71. Also shown in phantom are the adhesive dots or spots 75, (like those 55 of FIG. 3), which secure the two shingle layers together, and which have a heat resistance at a temperature level that is higher than the heat resistance of the adhesive of the strips S1, S2, S3 applied to tabs 59 and headlap zone 73, such as via applicator 44. It will be apparent that the application of adhesive, instead of being drops or spots 75, may be a continuous strip, between the right-most end 76 of the shingle 70 of FIG. 4 and the left-most end 77, as may be desired. Possibly also, the adhesive applied via applicator 44 will be co-extensive with those portions of the rear surface of the anterior shingle layer 71 that form the tabs 59, or in horizontal strips as shown or as spots (not shown). The adhesive that is applied as spots 75 will preferably be that which has the higher level of heat resistance, to at least 140° F., and more preferably to at least 170° F. along the common bond area 73, between the right-most end 76 of the shingle 70 of FIG. 4 and the left-most end 77, as may be desired. Preferably, the adhesive applied via applicator 44 will be co-extensive with those portions of the rear surface of the anterior shingle layer 71 that form the tabs 59. The adhesive that is applied to the common bond area 73 will preferably be that which has the higher level of heat resistance, to at least 140° F., and more preferably to at least 170° F. Such adhesive will have a softening point that is at least as high as 197° F., and more preferably, at least as high as 240° F., and perhaps as high as 275-300° F. Alternatively, the adhesives that form strips S1, S2, S3 and spots 75 may be applied to the anterior surface of the posterior shingle layer to secure the layers 71 and 72 together, or to contacting surfaces of both layers 71, 72.

The adhesive that is applied as spots 75, or in some other form, and which is a high temperature softening point adhesive, and preferably a high heat resistance adhesive may comprise a non-bituminous adhesive having heat resistance to a predetermined temperature level, which may be an epoxy adhesive and/or may be a two-part thermal set adhesive or a one-part thermal or moisture set adhesive and will also preferably have a high shear modulus for securely holding the two to layers of shingle together. Such sheer modulus (SM) is defined as the ratio of shear stress to shear strain. Thus, if shear stress is defined as shearing Force divided by the Area and if shear strain is defined as the change in dimension (x) relative to the original dimension (y), then shear modulus is defined as:

$$SM = \frac{F/A}{x/y}$$

In the metric system, the modulus is expressed in Newtons per square meter (Newtons/m$^2$).

A preferred shear modulus in accordance with the present invention is one that is greater than 10,000 Newtons/m$^2$ and having a shear modulus after 1000 seconds of stress exposure at constant loading at approximately at least 150° F., greater than 1000 Newtons/m$^2$.

Figure 5:
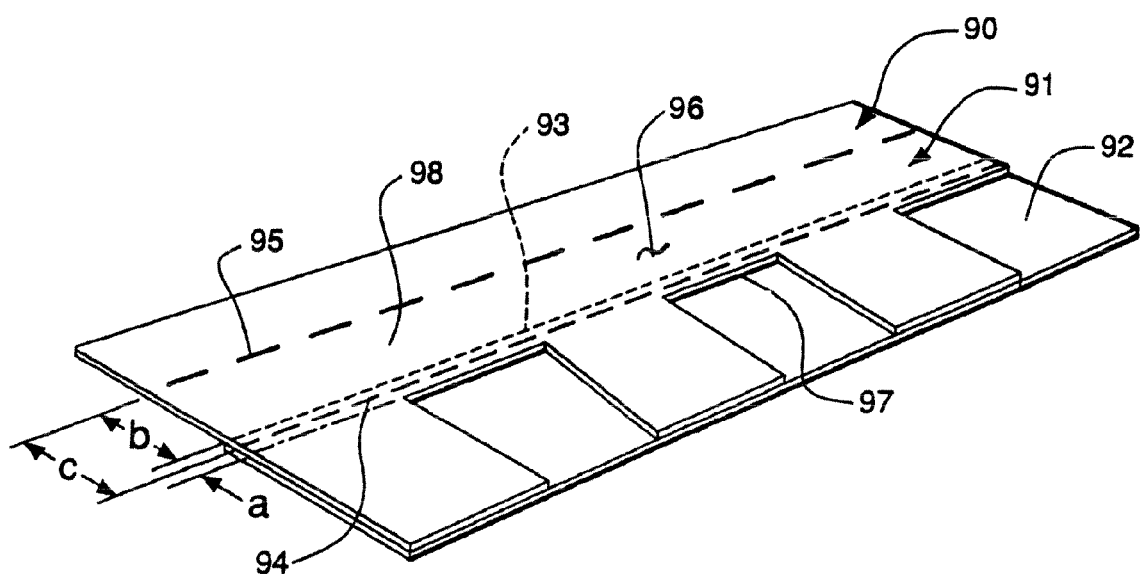
FIG. 5 is a top perspective view of another embodiment of the shingle of this invention.

Referring now to FIG. 5, it will be seen that a shingle 90 is provided, comprised of two shingle layers 91 and 92, that are adhered together in a manner similar to the shingle layers of FIG. 4, such that the same will not be repeated here.

However, in FIG. 5, it will be seen that a pair of rows of sealant 94, 95 are shown on the anterior surface of the anterior shingle layer. These rows of sealant may preferably be provided with strips of release paper thereon, when the shingles 90 are packaged together, to be removed prior to installation on a roof, or in the alternative, those portions of a shingle that are packaged adjacent the shingle 90 when the same are packaged together, may have release paper on those portions of that shingle that would be packaged against the sealant rows 94, 95, in the packaged condition, to prevent adjacent shingles in a given package from sticking together. In any event, a shingle as shown in FIG. 5, prior to its installation on a roof, will not have release paper disposed over sealant 94, 95, at that time that the shingle is applied to a roof.

It will be seen that the sealant row 94 is provided generally in that headlap portion 96, below the upper edge 93 of the posterior shingle layer, and above the upper edge 97 of the cut-out in the anterior shingle layer, to define for the shingle installer, on the top surface of the shingle as it is being installed on a roof, a lower end to a nailing zone, the upper end of which nailing zone 98 is defined by the row of sealant 95, placed as shown.

In the embodiment of FIG. 5, the rows of sealant 94, 95, are spaced apart a distance "c", which may be, for example, on the order of two inches, whereas the distance above the upper edge 93 of the posterior shingle layer, that the row of sealant strips 95 is disposed may be a distance "b" that is on the order of 1⅞ to 2 inches, and with the headlap distance "a" being an overlap on the order of ⅜ inches or ½ inches, or even 1 inch. The wide nailing zone 98 that is displayed to a roofing installer, thereby suggests to the roofer, staples or the like, which secure the shingles to a roof, should be essentially through the single layer 91 of shingle material of the shingle 90, essentially above the upper edge 93 of the posterior shingle layer, because of the close proximity of the sealant layer 94 thereto, and below the line defined by the strips of sealant 95.

It should be apparent from the above that, in accordance with this invention, the overlapping headlap zone "a" can be reduced, resulting in a saving in material, and packaging of shingles without creating a "humping" when shingles are packaged due to excessive height of the posterior shingle layer, while allowing for rapid installation of the shingles in the field.

However, instead of the row of sealant 95 of FIG. 5, there is provided a scribe or score line 105, which, in lieu a row of sealant at that location, can provide for the roofing installer, an upper indication of the nailing zone 98.

It will be apparent from the foregoing that if fasteners happen to be applied through only the anterior shingle layer 71, and through only that portion of the anterior shingle layer 80 that is above the upper edge 74 of the posterior shingle layer 72, then with the stronger adhesive 75 applied in the common bond area e.g. like that shown in FIG. 4, the posterior shingle layer will remain in place even under high temperature conditions and on roofs of steeper slope or pitch.

Figure 6:
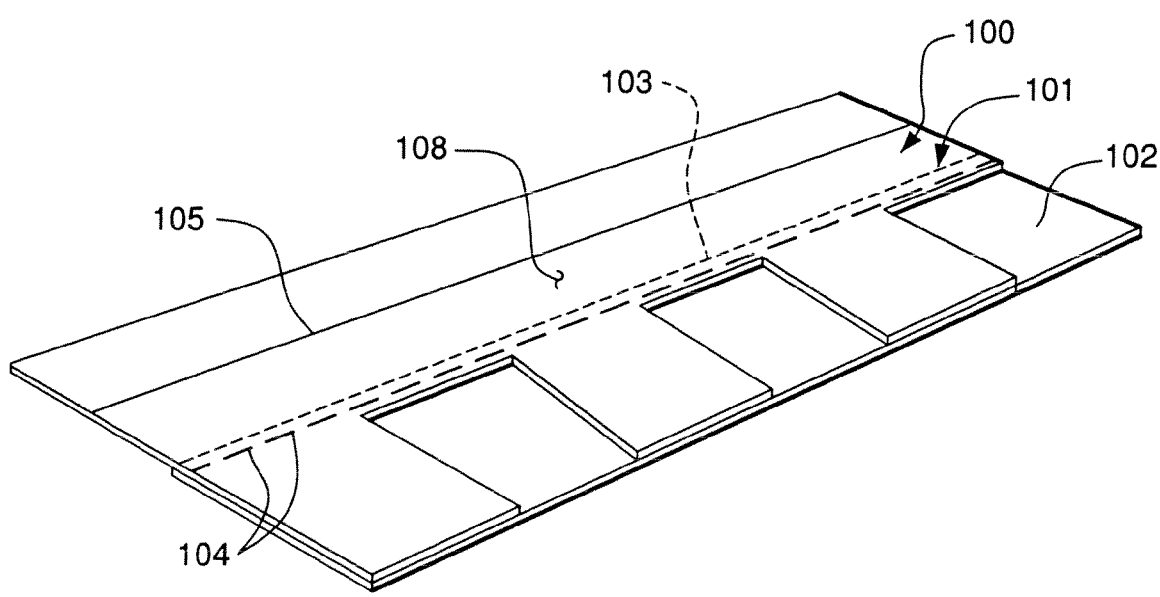
FIG. 6 is an illustration similar to that of FIG. 5, but of yet another alternative embodiment in accordance with this invention.

With reference now to FIG. 6, it will be shown that there is a shingle that, for the most part, is constructed like the shingle of FIG. 5, with the shingle 100 being comprised of anterior and posterior layers 101, 102 the posterior layer of which has an upper edge 103, and with a row of sealant 104 being disposed on the anterior shingle layer 101 similar to the row of sealant 94 of FIG. 5, and with the scribe line 105 defining an upper demarcation line for the nailing zone.

Figure 7:
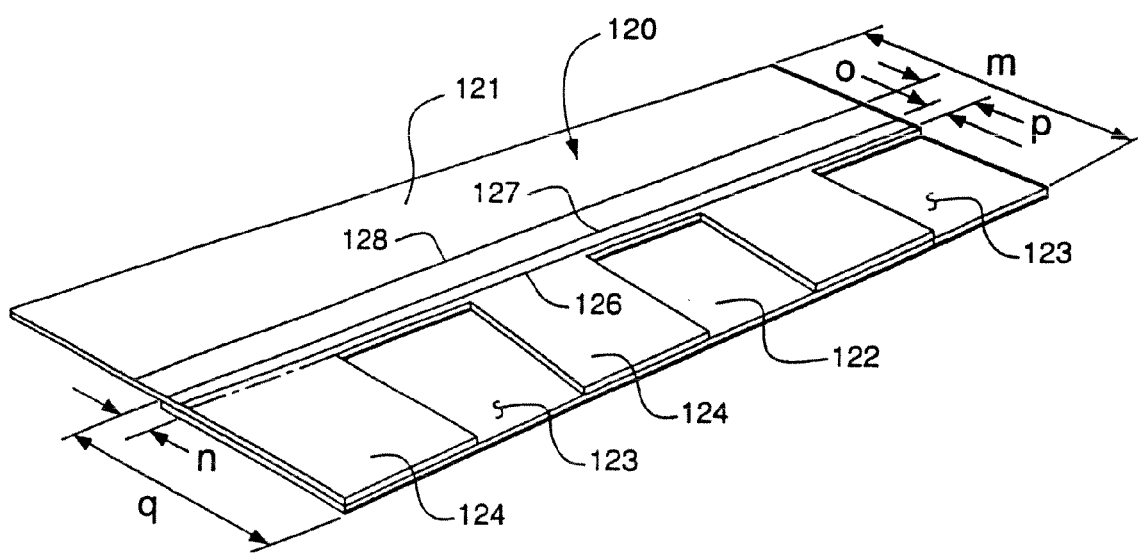
FIG. 7 is an illustration similar to that of FIGS. 5 and 6, but wherein the upper surface of the anterior shingle layer is provided with three demarcation limits, defining a fastening zone for fastening through two shingle layers, and a fastening zone for fastening through, at least in principal part, a single layer fastening zone, such that the installer has options.

Referring now to FIG. 7, an alternative multi-layer laminated shingle 120 is shown, having anterior and posterior layers, 121, 122, respectively, with cut-outs 123 in the anterior shingle layer, spacing apart tabs 124 of the anterior shingle layer, and having a width for the anterior shingle layer "m" of 12 inches, with the posterior shingle layer having a width "q" of approximately 6 inches, leaving a common bond headlap area above the upper edge 125 of the cut-out areas 123, designated as "n", of approximately ⅞ inch to 1 inch.

Demarcation limits or lines 126, 127 and 128 are shown, which are markings to guide a shingle installer, as to where the nails, staples or other forms of fastener should be placed, to fasten the shingle 120 to a roof or the like. The lines 126, 127 and 128 maybe discrete lines, as shown, or may be demarcation limits in the form of upper and lower ends of bands, of different color, shading, etc, as desired. The demarcation limits 126, 127 and 128 may also be scribed lines, or any other form of marking to enable a shingle installer to see the zones that such demarcation limits present for fastening the shingle to a roof.

For example, the width of the zone between lines 126 and 127, of "o" may perhaps be 5/16 inches, for guiding the installer as to where a fastener may be applied to assure that it will go through both posterior and anterior shingle layers, if the perceived security of nailing through two layers is desired.

The distance between demarcation limits 126 and 128, as shown by "p", may, however, be on the order of 1¾ inches, more or less, to define a wider fastening zone, for instances where the installer is comfortable fastening the shingle through either a shingle thickness in the anterior shingle layer only, or a double thickness portion through both the anterior and posterior shingle layers.

Alternatively, if the installer is comfortable nailing only through a single layer of the laminated shingle; namely the anterior shingle layer, the fastener can be applied between demarcation limits 127 and 128, in a zone of approximately 1⅜ inch in width. The layers 121 and 122 of shingle 120 are adhered together by any of the higher temperature or high shear modulus adhesives discussed above, that will securely hold them together under the above-mentioned conditions of temperature, slope, etc.

Figure 8:
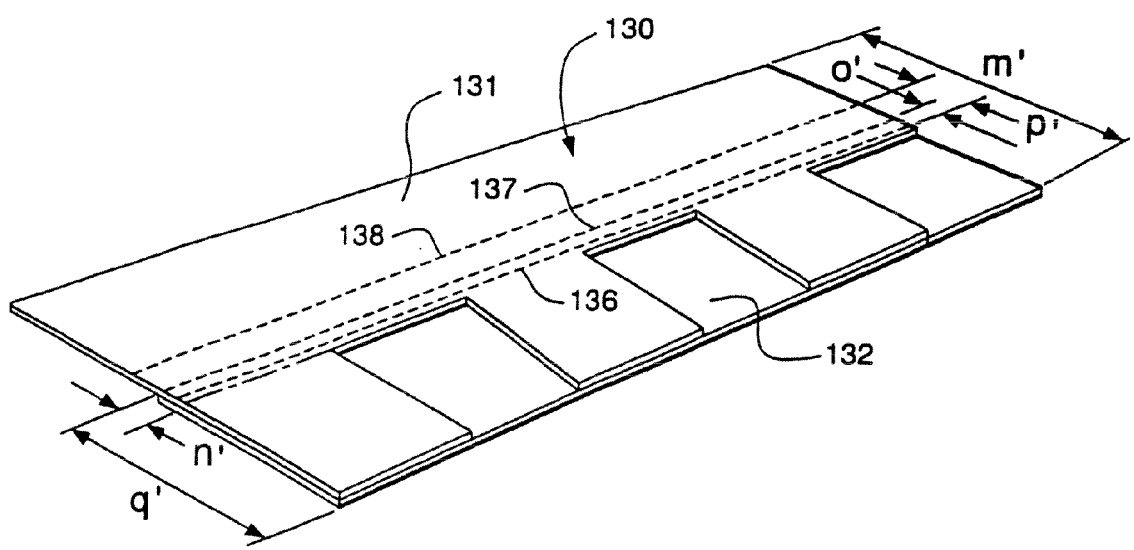
FIG. 8 is an illustration similar to that of FIG. 7, but wherein the demarcation limits for the fastening zones of FIG. 7 are comprised of spaced-apart lines of either markings or adhesive.

With reference now to FIG. 8, it will be seen that a shingle 130, comprised of anterior and posterior shingle layers 131, 132 is also provided, and is constructed essentially similarly to that of the shingle of FIG. 7, except that the demarcation limits or lines 136, 137 and 138 of the shingle of FIG. 8 are illustrated as being broken or spaced-apart lines. Such lines may be scribe lines, colored lines, portions of a bands or the like, or may be comprised of lines of adhesive. The dimensions m', n', o', p', and q' may be similar to the dimensions m n o p q of FIG. 7, just as the adhesive that adheres layers 131 and 132 together may be as described above for the shingle of FIG. 7.

Accordingly, it will be apparent from the foregoing that the objects of the present invention are satisfied, and that various modifications may be made in the details of construction, as well as in the use and operation of shingles in accordance with the present invention, all within the spirit and scope of the invention as defined in the appended claims.

What is claimed is:

1. A multi-layer laminated shingle comprising:
   (a) an anterior shingle layer of a first width between upper and lower edges and having front and rear surfaces with at least one cutout extending into the width of the anterior shingle layer an amount terminating in an upper cutout edge;
   (b) a posterior shingle layer of a second width, less than the first width, and having front and rear surfaces;
   (c) with the anterior shingle layer having upper and lower areas on the rear surface thereof;
   (d) with the front surface of the posterior shingle layer being disposed against the lower area of the rear surface of the anterior shingle layer and comprising with the anterior shingle layer a double layer area, leaving the upper area of the rear surface of the anterior shingle layer not having the posterior shingle layer disposed thereagainst;
   (e) an adhesive having heat resistance to a predetermined temperature level of at least 140° F. disposed between said shingle layers, securing said layers together;
   (f) a visibly marked fastening zone on the front surface of the anterior shingle layer, with said fastening zone being defined by upper and lower demarcation limits;
   (g) the upper demarcation limit being opposite the upper area of the rear surface of the anterior shingle layer;
   (h) the lower demarcation limit being opposite the lower area of the rear surface of the anterior shingle layer, and above the upper cutout edge of the anterior shingle layer;
   (i) whereby the fastening zone on the anterior shingle layer has a portion of smaller width through a common bond area of both anterior and posterior shingle layers and has a portion of greater width, through only the anterior shingle layer; and
   (j) whereby when the shingle is installed on a sloped roof and fastened through only the single thickness upper area of the anterior shingle layer in a second fastening zone, the thus fastened shingle and the adhesive together comprise means whereby the posterior shingle layer will remain in place, adhered behind the anterior shingle layer by the adhesive.

2. A multi-layer laminated shingle comprising:
   (a) an anterior shingle layer of a first width between upper and lower edges and having front and rear surfaces with at least one cutout extending into the width of the anterior shingle layer an amount terminating in an upper cut out edge;
   (b) a posterior shingle layer of a second width, less than the first width, and having front and rear surfaces;
   (c) with the anterior shingle layer having upper and lower areas on the rear surface thereof;
   (d) with the front surface of the posterior shingle layer being disposed against the lower area of the rear surface of the anterior shingle layer and comprising with the anterior shingle layer a double layer area, leaving a single thickness upper area of the rear surface of the anterior shingle layer not having the posterior shingle layer disposed thereagainst;
   (e) an adhesive having heat resistance to a predetermined temperature level of at least 140° F. disposed between said shingle layers, securing said layers together;
   (f) optional first and second fastening zones on the front surface of the anterior shingle layer and defined by at least three demarcation limits;
   (g) the first optional fastening zone being defined by demarcation limits opposite the double layer area and above the upper cutout edge of the anterior shingle layer;
   (h) the second optional fastening zone of greater width than the first optional fastening zone, the majority of which greater width being above a common bond area of both anterior and posterior shingle layers and the second optional fastening zone being defined by a demarcation limit opposite the single thickness upper area of the rear surface of the anterior shingle layer and by one of the demarcation limits of clause (g) above, and
   (i) whereby a shingle installer has the option of fastening the shingle through either or both of the first and second fastening zones; and
   (j) whereby when the shingle is installed on a sloped roof and fastened through only the single thickness upper area of the anterior shingle layer in the second optional fastening zone, the thus fastened shingle and the adhesive together comprise means whereby the posterior layer will remain in place, adhered behind the anterior shingle layer by the adhesive.

3. A multi-layer laminated shingle comprising:
   (a) an anterior shingle layer of a first width between upper and lower edges and having front and rear surfaces;

(b) a posterior shingle layer of a second width, less than the first width, and having front and rear surfaces;
(c) with the anterior shingle layer having upper and lower areas on the rear surface thereof;
(d) with the front surface of the posterior shingle layer being disposed against the lower area of the rear surface of the anterior shingle layer, leaving the upper area of the rear surface of the anterior shingle layer not having the posterior shingle layer disposed thereagainst;
(e) an adhesive having heat resistance to a predetermined temperature level of at least 140° F. disposed between said shingle layers, securing said layers together;
(f) three demarcation limits on the front surface of the anterior shingle layer, located thereon at progressively spaced-apart first, second and third different distances from the lower edge to the upper edge of the anterior shingle layer, to comprise means for defining:
 (i) a first fastening zone between the first and second said demarcation limits for fastening the shingle to a roof by fasteners applied through both anterior and posterior layers; and
 (ii) a second fastening zone between the second and third said demarcation limits for fastening the shingle to a roof by fasteners applied through it, said second fastening zone having a majority of its area present in the upper area of the anterior shingle layer above a common bond area of both anterior and posterior shingle layers;
(g) whereby, when the shingle is installed on a sloped roof and fastened through only the upper area of the anterior shingle layer not having the posterior shingle layer disposed thereagainst, the thus fastened shingle and the adhesive together comprise means whereby the posterior layer will remain in place, adhered behind the anterior shingle layer by the adhesive.

4. The shingle of any one of claims 1-3, where at least some of said demarcation limits comprise marked lines.

5. The shingle of any one of claims 1-3, where at least some of said demarcation limits comprise adhesive lines.

6. The shingle of any one of claims 1-3, wherein at least some of said demarcation limits define at least one band.

7. The shingle of any one of claims 1-3, wherein the demarcation limits comprise three marked lines, two of which define a double-layer fastening zone, and two of which define at least a portion of a single-layer fastening zone, the single layer fastening zone having a width that is greater than that of the double layer fastening zone, comprising means presenting fastening zone options of different sizes.

8. The shingle of any one of claims 1-3, wherein at least some said adhesive is heal resistant to at least 170° F.

9. The shingle of any one of claims 1-3, wherein at least some said adhesive has a softening point at least as high as 197° F.

10. The shingle of any one of claims 1-3, wherein at least some said adhesive has a softening point at least as high as 240° F.

11. The shingle of any one of claims 1-3, wherein at least some said adhesive is selected from the group of ethylene vinyl acetate, polyamide, and polyurethane.

12. The shingle of any one of claims 1-3, wherein the posterior shingle layer is less than half the first width, and wherein said second width of said posterior shingle layer comprises means whereby, when laminated shingles are alternated in a packaging stack, the stack is free of humping.

* * * * *